(12) United States Patent
Hatami (10) Patent No.: US 10,682,919 B2
(45) Date of Patent: Jun. 16, 2020

(54) ELECTRIC VEHICLE

(71) Applicant: HONDA MOTOR CO., LTD., Minato-ku, Tokyo (JP)

(72) Inventor: Makoto Hatami, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 113 days.

(21) Appl. No.: 15/986,891

(22) Filed: May 23, 2018

(65) Prior Publication Data
US 2018/0345820 A1    Dec. 6, 2018

(30) Foreign Application Priority Data

May 31, 2017    (JP) .................................. 2017-107988

(51) Int. Cl.
*B60L 15/00* (2006.01)
*B60K 1/00* (2006.01)
(Continued)

(52) U.S. Cl.
CPC .............. *B60L 15/007* (2013.01); *B60K 1/00* (2013.01); *B60K 1/04* (2013.01); *B60L 50/51* (2019.02);
(Continued)

(58) Field of Classification Search
CPC ....... B60L 15/00; B60L 2210/30; B60K 1/00; B60W 20/40; B60W 20/442;
(Continued)

(56) References Cited

U.S. PATENT DOCUMENTS 5,875,106 A * 2/1999 Tenconi .................. H02J 7/022
363/98
7,309,966 B2 * 12/2007 Wobben .................. B60L 55/00
318/139
(Continued)

FOREIGN PATENT DOCUMENTS

JP    2009-259785    11/2009
JP    2012-085481    4/2012
(Continued)

OTHER PUBLICATIONS

Japanese Office Action for Japanese Patent Application No. 2017-107988 dated Oct. 30, 2018.

*Primary Examiner* — Rexford N Barnie
*Assistant Examiner* — Jagdeep S Dhillon
(74) *Attorney, Agent, or Firm* — Amin, Turocy & Watson, LLP (57) ABSTRACT

An electric vehicle includes: a motor that is arranged on a first side of front and rear sides of a vehicle; a rechargeable electric source that is arranged closer to a vehicle room than the motor; an inverter unit that includes an inverter which is fixed to the motor and which is configured to control and drive the motor by electric power that is supplied from the electric source; a charge circuit for charging the electric source; and a first unit that is fixed to a vehicle body at the first side of the vehicle, wherein the inverter unit is connected to the electric source by a cable, and the first unit is connected to the electric source by a cable that is independent of the cable which connects together the inverter unit and the electric source.

7 Claims, 4 Drawing Sheets

(51) Int. Cl.
*H02J 7/00* (2006.01)
*H02P 27/06* (2006.01)
*B60L 53/22* (2019.01)
*B60K 1/04* (2019.01)
*B60L 50/51* (2019.01)
*B60L 53/10* (2019.01)
*B60L 50/70* (2019.01)
*H02J 7/02* (2016.01)
*H02J 7/14* (2006.01)

(52) U.S. Cl.
CPC .............. *B60L 50/70* (2019.02); *B60L 53/11* (2019.02); *B60L 53/22* (2019.02); *H02J 7/0068* (2013.01); *H02P 27/06* (2013.01); *B60L 2270/145* (2013.01); *H02J 7/0045* (2013.01); *H02J 7/02* (2013.01); *H02J 7/14* (2013.01)

(58) Field of Classification Search
CPC ......... B60W 20/387; H02P 27/06; H02J 7/00; H02J 7/0047; H02J 7/42; H02M 7/42
USPC ................. 307/10.1, 10.2, 10.7, 9.1, 26, 22; 180/65.21, 65.22, 65.31, 69.6, 65.1; 363/98, 132; 320/137, 126, 127, 109; 318/139; 340/635–636.2
See application file for complete search history.

(56) References Cited

U.S. PATENT DOCUMENTS

| | | | | |
|---|---|---|---|---|
| 8,350,527 | B2* | 1/2013 | Ichikawa | H02J 7/02 320/109 |
| 8,669,739 | B2* | 3/2014 | Ohtomo | H02J 7/0031 320/109 |
| 9,150,113 | B2* | 10/2015 | Ichikawa | B60L 11/1824 |
| 10,220,831 | B2* | 3/2019 | Colavincenzo | B60W 20/40 |
| 2007/0252435 | A1* | 11/2007 | Coe | H02J 7/1423 307/10.1 |
| 2009/0079389 | A1* | 3/2009 | Ohtomo | B60K 6/28 320/109 |
| 2010/0025127 | A1* | 2/2010 | Oyobe | B60L 50/66 180/65.22 |
| 2013/0207608 | A1* | 8/2013 | Kawashima | H01M 10/44 320/109 |
| 2015/0258904 | A1* | 9/2015 | Moribe | B60L 11/1816 320/109 |

FOREIGN PATENT DOCUMENTS

| | | |
|---|---|---|
| JP | 2013-017245 | 1/2013 |
| JP | 2013-115957 | 6/2013 |
| JP | 2015-071389 | 4/2015 |
| JP | 2015-071399 | 4/2015 |

* cited by examiner

ELECTRIC VEHICLE

CROSS-REFERENCE TO RELATED APPLICATION

Priority is claimed on Japanese Patent Application No. 2017-107988, filed on May 31, 2017, the contents of which are incorporated herein by reference.

BACKGROUND

Field of the Invention

The present invention relates to an electric vehicle.

Background

In the related art, among electric vehicles, for example, an electric vehicle disclosed in Japanese Patent Application, Publication No. 2013-115957A is known. The electric vehicle of Japanese Patent Application, Publication No. 2013-115957A includes a motor, a battery which is an electric source, an inverter unit, a battery charger, an electric compressor, and a branch unit.

The motor is arranged in a motor room that is provided on a front side of the vehicle. The battery is arranged closer to a vehicle room than the motor and is a rechargeable device. The inverter unit is fixed to the motor and controls and drives the motor by electric power that is supplied from the battery. The battery charger is a device for charging the battery. The electric compressor is arranged on a front side of the vehicle and is driven by electric power that is supplied from the battery. The branch unit is arranged in the inverter unit. The branch unit has a branch part that allows electric power from the battery to branch into the battery charger and the electric compressor.

The battery and the inverter unit are electrically connected by a cable. An oscillation system of the motor that is oscillated by a rotation drive is different from an oscillation system of a vehicle body and the battery which is fixed to the vehicle body that is oscillated by the vehicle traveling. The cable absorbs a phase difference that is caused by the difference of the oscillation system by deformation (hereinafter, referred to as an "oscillation absorption").

In the electric vehicle of Japanese Patent Application, Publication No. 2013-115957A, the branch unit that is connected to the battery charger and the electric compressor is arranged in the inverter unit. At this time, the cable that electrically connects together the battery and the inverter unit needs to supply electric power to the electric compressor in addition to the motor and therefore tends to have a thick diameter compared to a case in which electric power is supplied only to the motor.

SUMMARY

In general, as the diameter becomes thick, a cable tends to be not easily deformed when absorbing oscillation. Accordingly, in the related art, there is a room for improvement in a viewpoint that the phase difference between the oscillation system of the motor and the oscillation system of the battery which is fixed to the vehicle body is absorbed according to oscillation absorption by the cable.

An object of an aspect of the present invention is to provide an electric vehicle that is capable of easily absorbing, according to oscillation absorption, a phase difference between oscillations of components having a different oscillation system.

(1) An electric vehicle according to an aspect of the present invention includes: a motor that is arranged on a first side of front and rear sides of a vehicle; a rechargeable electric source that is arranged closer to a vehicle room than the motor; an inverter unit that includes an inverter which is fixed to the motor and which is configured to control and drive the motor by electric power that is supplied from the electric source; a charge circuit that is connected the electric source for charging the electric source; and a first unit that is connected to the charge circuit and that is fixed to a vehicle body at the first side of the vehicle, wherein the inverter unit is connected to the electric source by a cable, and the first unit is connected to the electric source by a cable that is independent of the cable which connects together the inverter unit and the electric source.

(2) The electric vehicle described above may include another device that is arranged on the first side of the vehicle and that is driven by electric power which is supplied from the electric source, wherein the first unit may be a branch unit having a branch part that is configured to allow an electric power route from the electric source to branch into the charge circuit and the another device.

(3) In the electric vehicle described above, the branch unit may include a fuse that is connected to the branch part, and the branch unit may be arranged above the inverter unit such that at least part of the branch unit is overlapped with the inverter unit in a top view.

(4) In the electric vehicle described above, a lid part that is capable of being opened and closed may be provided on an upper surface of the branch unit.

(5) The electric vehicle described above may include: a quick charge circuit for quickly charge the electric source; a first cable that electrically connects together the electric source and the branch unit; and a second cable that electrically connects together the branch unit and the quick charge circuit, wherein the first cable and the second cable may be arranged so as to straddle the lid part above the branch unit.

(6) In the electric vehicle described above, the branch unit may include a relay that is configured to electrically cut off and connect a predetermined circuit and the electric source by opening and closing a contact point.

(7) In the electric vehicle described above, the branch unit may include a relay that is configured to electrically cut off and connect the quick charge circuit and the electric source by opening and closing a contact point.

(8) In the electric vehicle described above, the relay may be a contactor.

In the above electric vehicle described in (1), since the inverter unit is connected to the electric source by a cable, and the first unit that is fixed to the vehicle body is connected to the electric source by a cable that is independent of the cable which connects together the inverter unit and the electric source, it is possible to prevent the diameter of the cable that electrically connects together the electric source and the inverter unit from becoming thick compared to the related art in which the first unit is arranged inside the inverter unit. Accordingly, it is possible to easily absorb, according to oscillation absorption, the phase difference between oscillations of the electric source and the inverter unit having a different oscillation system from each other by the displacement of the cable.

Further, the inverter unit is connected to the electric source by a cable, the first unit is connected to the electric source by a cable that is independent of the cable which connects together the inverter unit and the electric source, and thereby, it is possible to arrange the cable that connects together the inverter unit and the electric source and the cable that connects together the first unit and the electric source separately from each other. The first unit and the electric source are fixed to the vehicle body, therefore have an identical oscillation system, and are not greatly oscillated compared to a case (for example, a case in which the first unit is fixed to the motor, and the electric source is fixed to the vehicle body) in which the first unit and the electric source have a different oscillation system. Accordingly, it is possible to prevent the cable that connects together the inverter unit and the electric source and the cable that connects together the first unit and the electric source from interfering with each other.

In the above electric vehicle described in (2), since the first unit is a branch unit having a branch part that is configured to allow an electric power route from the electric source to branch into the charge circuit and the another device, the inverter unit is connected to the electric source by a cable, and the branch unit that is connected to the charge circuit and the another device is connected to the electric source by a cable that is independent of the cable which connects together the inverter unit and the electric source, it is possible to prevent the diameter of the cable that electrically connects together the electric source and the inverter unit from becoming thick compared to the related art in which the branch unit is arranged inside the inverter unit. Accordingly, it is possible to easily absorb, according to oscillation absorption, the phase difference between oscillations of the electric source and the inverter unit having a different oscillation system from each other by the displacement of the cable.

Further, the inverter unit is connected to the electric source by a cable, the branch unit is connected to the electric source by a cable that is independent of the cable which connects together the inverter unit and the electric source, and thereby, it is possible to arrange the cable that connects the inverter unit and the electric source and the cable that connects together the branch unit and the electric source separately from each other. The branch unit and the electric source are fixed to the vehicle body, therefore have an identical oscillation system, and are not greatly oscillated compared to a case (for example, a case in which the branch unit is fixed to the motor, and the electric source is fixed to the vehicle body) in which the branch unit and the electric source have a different oscillation system. Accordingly, it is possible to prevent the cable that connects the inverter unit and the electric source and the cable that connects together the branch unit and the electric source from interfering with each other.

In the above electric vehicle described in (3), the branch unit includes a fuse and is arranged above the inverter unit. Thereby, the open and close work of the branch unit becomes easy compared to a case in which the branch unit is arranged below the inverter unit. Accordingly, in the electric vehicle described above, it is possible to easily perform a replacement work of the fuse.

Further, the branch unit is arranged above the inverter unit such that at least part of the branch unit is overlapped with the inverter unit in a top view, and therefore, a compact arrangement in a top view is realized compared to a case in which the inverter unit and the branch unit are arranged side-by-side. Thereby, it is possible to secure a passage space of a harness and an arrangement space of an auxiliary machine and the like around the motor and the inverter unit, and therefore, it is possible to obtain an electric vehicle having an excellent layout property.

In the above electric vehicle described in (4), a lid part that is capable of being opened and closed is provided on an upper surface of the branch unit. According to this configuration, by opening the lid part, it is possible to replace the fuse that is arranged in the branch unit without unloading the branch unit from the electric vehicle. Accordingly, in the electric vehicle described above, it is possible to further easily perform a replacement work of the fuse.

In the above electric vehicle described in (5), the first cable that electrically connects the electric source and the branch unit and the second cable that electrically connects the branch unit and the quick charge circuit are arranged so as to straddle the lid part above the branch unit. Thereby, it is possible to effectively use a space that is present above the branch unit as an arrangement space of the first cable and the second cable. Accordingly, it is possible to prevent the arrangement space of the first cable and the second cable from being increased. Therefore, in the electric vehicle described above, it is possible to save a space with respect to the arrangement of the first cable and the second cable.

In the above electric vehicle described in (6), the branch unit includes a relay that is configured to electrically cut off and connect a predetermined circuit and the electric source by opening and closing a contact point.

In the above electric vehicle described in (7), the branch unit includes a relay that is configured to electrically cut off and connect the quick charge circuit and the electric source by opening and closing a contact point.

The branch unit is fixed to the vehicle body in a state of being separated from the motor and the inverter unit, and therefore, the relay that is provided on the branch unit is not directly subject to the oscillation that is generated from the motor when the motor is driven and rotated. Accordingly, the electric vehicle described above can prevent the degradation of durability of the relay of the branch unit that is caused by the oscillation of the motor.

In the above electric vehicle described in (8), the relay is a contactor. Thereby, it is possible to enhance the reliability of the relay with respect to the cutoff and the power distribution.

DESCRIPTION OF THE EMBODIMENTS

Hereinafter, an embodiment of the present invention will be described with reference to the drawings.

Figure 1:
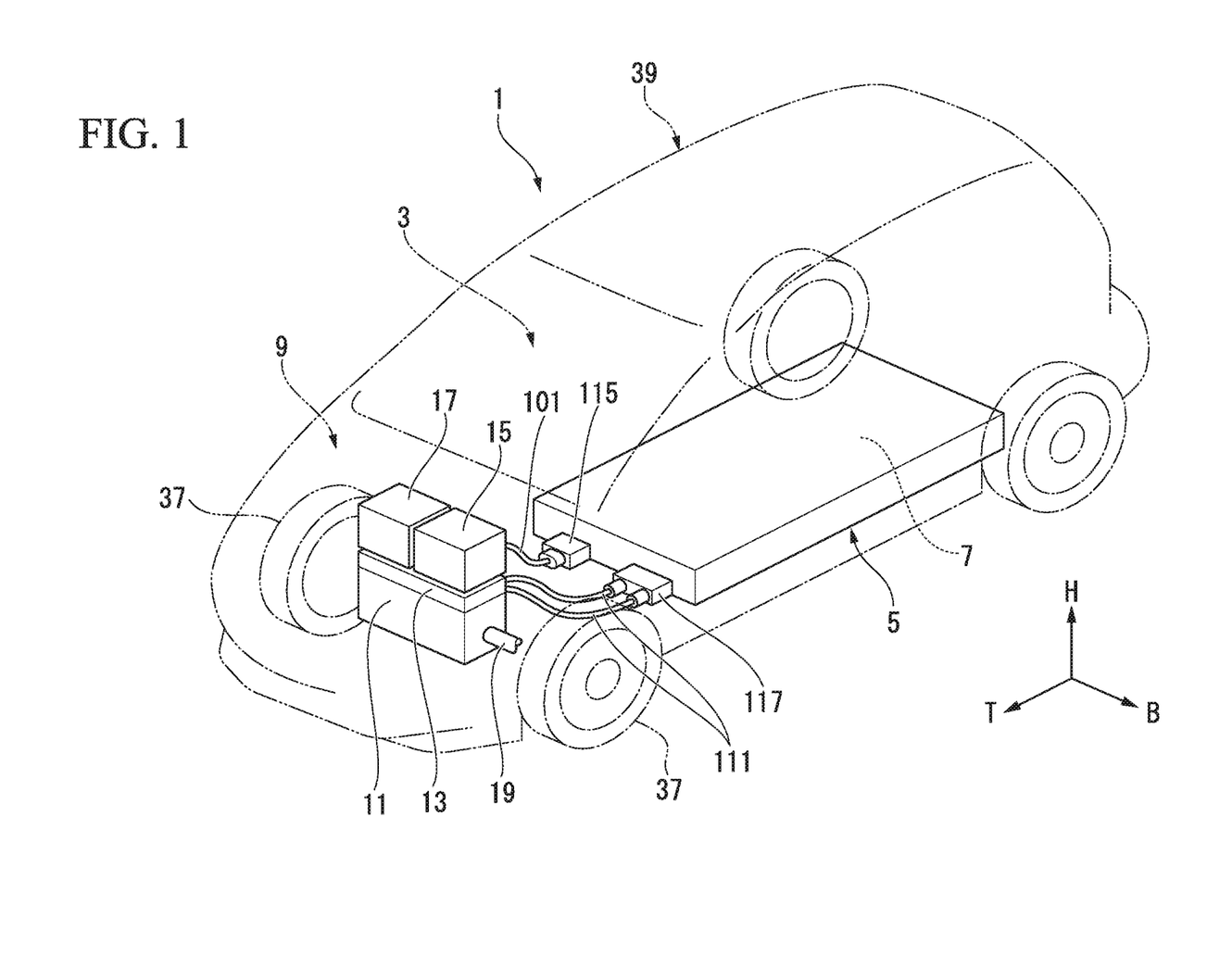
FIG. 1 is a perspective view showing a schematic configuration of an electric vehicle of an embodiment.

FIG. 1 is a perspective view showing a schematic configuration of an electric vehicle 1 of an embodiment of the present invention.

Figure 2:
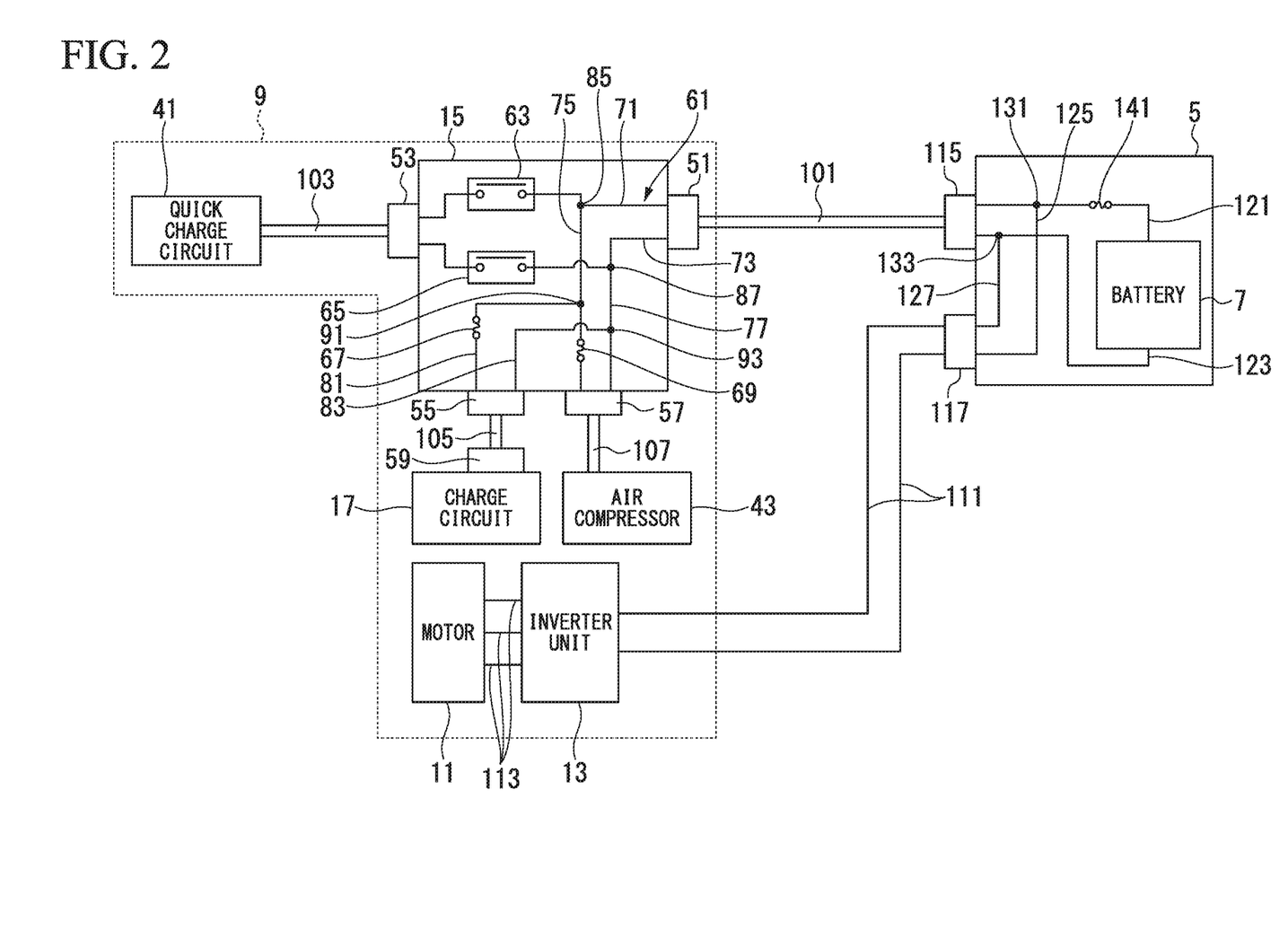
FIG. 2 is a block diagram showing a configuration in a motor room and a configuration in a battery case of the electric vehicle of the embodiment.

FIG. 2 is a block diagram showing a configuration in a motor room and a configuration in a battery case of the electric vehicle of the embodiment.

The frontward, rearward, rightward, leftward, upward, and downward directions in the following description are the same as the frontward, rearward, rightward, leftward, upward, and downward directions in the electric vehicle 1 unless otherwise specified. In the drawings, an arrow T indicates a vehicle frontward direction, an arrow B indicates a vehicle leftward direction, and an arrow H indicates a vehicle upward direction.

As shown in FIG. 1, in a vehicle body 39 of the electric vehicle 1, a battery case 5 is provided on an underfloor part of a vehicle room 3. As shown in FIG. 2, a battery 7 (electric source) is housed in the battery case 5.

A motor room 9 is provided on a front part of the electric vehicle 1. A motor 11, an inverter unit 13, a branch unit 15 (first unit), a charge circuit 17, and the like are provided in the motor room 9.

A rotation drive force of the motor 11 is transmitted to a shaft 19. Each of front wheels 37, 37 of the electric vehicle 1 is connected to one of both end parts of the shaft 19.

The inverter unit 13 is arranged on an upper side of the motor 11 and is fastened and fixed directly to a case of the motor 11. An inverter (not shown) that is capable of mutually changing between DC power and three-phase AC power, a gate driver (not shown) that controls the inverter, a current sensor that measures a distributed current, and the like are provided inside the inverter unit 13. The inverter unit 13 is electrically connected to a connector 117 of the battery case 5 by an electric source cable 111 (cable). The inverter unit 13 is electrically connected to the motor 11, for example, by a three-phase bus bar 113. The inverter unit 13 controls and drives the motor 11 by electric power that is supplied from the battery 7.

The branch unit 15 and the charge circuit 17 are arranged parallel in a right-to-left direction. The branch unit 15 and the charge circuit 17 are arranged above the inverter unit 13 such that all parts of the branch unit 15 and the charge circuit 17 are overlapped with the inverter unit 13 in a top view. The branch unit 15 and the charge circuit 17 are arranged in a state of being separated from the inverter unit 13.

The branch unit 15 and the battery case 5 are electrically connected by a first cable 101 (cable) having a connector 51 and a connector 115 at each of both ends of the first cable 101.

The branch unit 15 is electrically connected to the charge circuit 17. The charge circuit 17 is connected to a general external electric source such as a household electric source and charges the battery 7. The charge circuit 17 and the branch unit 15 are electrically connected by a cable 105 having a connector 55 and a connector 59 at each of both ends of the cable 105.

Further, the branch unit 15 is electrically connected to a quick charge circuit 41 (predetermined circuit). The quick charge circuit 41 and the branch unit 15 are electrically connected by a second cable 103 having a connector 53 at an end of the second cable 103. The charge by the quick charge circuit 41 is performed by connecting the quick charge circuit 41 to an external electric source for quick charging that is provided, for example, at a service area, a power feeding station, and the like. In the quick charging, it is possible to charge the battery 7 in a shorter period of time than the charging via the charge circuit 17. The branch unit 15 has a positive electrode line contactor 63 (contactor) and a negative electrode line contactor 65 (contactor) described below inside the branch unit 15. The branch unit 15 electrically cuts off or connects together the quick charge circuit 41 and the battery 7.

An air compressor 43 is a so-called electric compressor that is driven by electric power which is supplied from the battery 7. A cable 107 having a connector 57 at an end part of the cable 107 extends from the air compressor 43. The air compressor 43 is electrically connected to the branch unit 15 by the cable 107.

Figure 3:
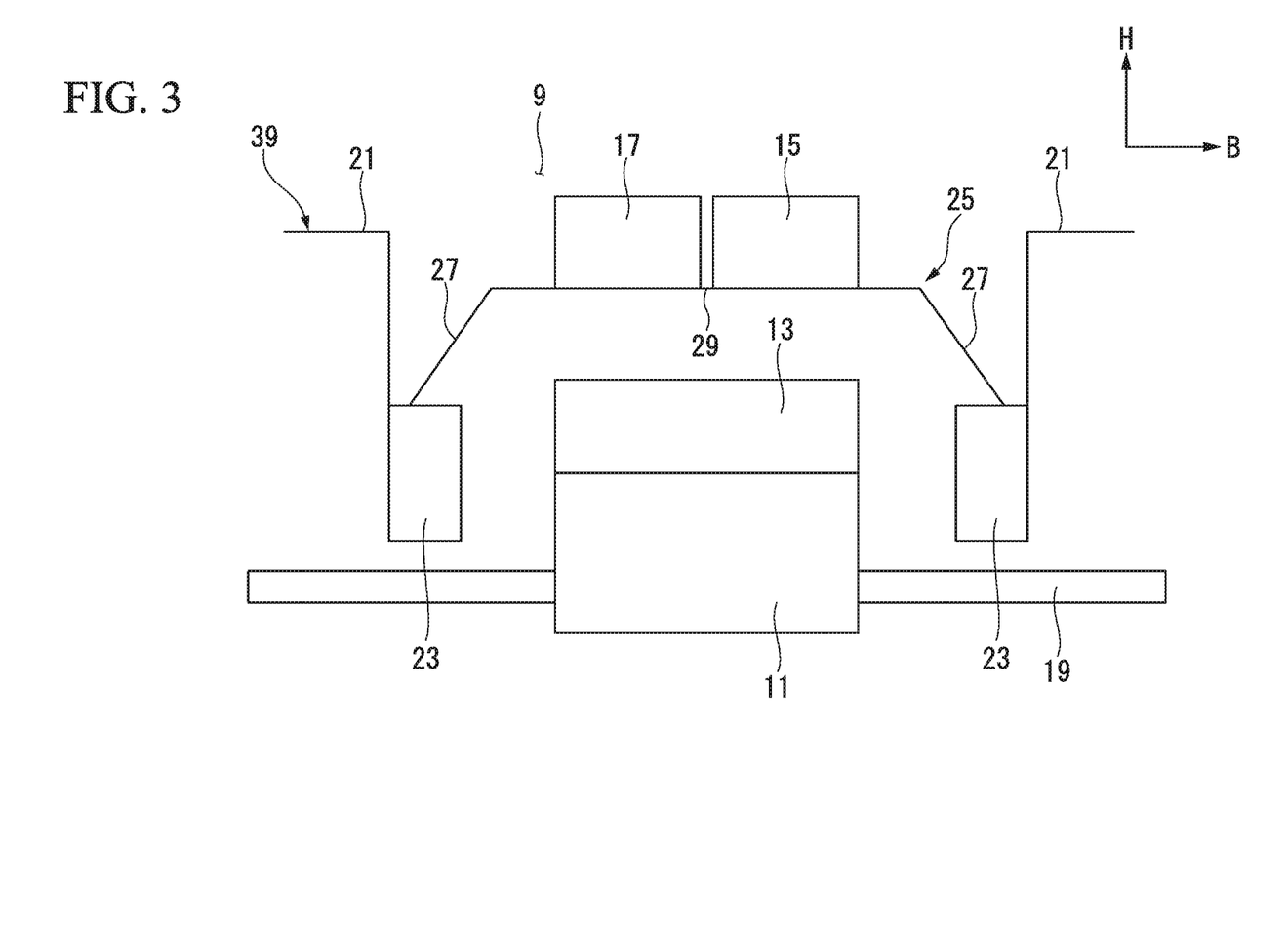
FIG. 3 is a schematic view of the inside of the motor room of the electric vehicle of the embodiment when seen from a vehicle front side.

FIG. 3 is a schematic view of the inside of the motor room of the electric vehicle of the embodiment when seen from a vehicle front side.

As shown in FIG. 3, the branch unit 15 and the charge circuit 17 are arranged above the inverter unit 13 in a state of being separated from the inverter unit 13. This is specifically described below.

A pair of damper housings 21, 21 are arranged in the motor room 9 so as to be separated in the right-to-left direction. The pair of damper housings 21, 21 are members that support a load which is input via a damper of a front suspension. Each of the pair of damper housings 21, 21 is joined to each of a pair of side frames 23, 23, for example, by welding or the like. The motor 11 and the inverter unit 13 described above are arranged between the pair of side frames 23, 23. A fixing frame 25 is joined to upper surfaces of the pair of side frames 23, 23. The pair of damper housings 21, 21, the pair of side frames 23, 23, and the fixing frame 25 are members that constitute the vehicle body 39 of the electric vehicle 1.

The fixing frame 25 is formed in a trapezoid shape that protrudes upward when seen from the vehicle front side. The fixing frame 25 includes a pair of support leg parts 27, 27 and a base part 29.

Each of lower ends of the pair of support leg parts 27, 27 is joined to each of upper surfaces of the pair of side frames 23, 23. Each of the pair of support leg parts 27, 27 is formed to diagonally extend toward an upper position of the inverter unit 13 from each of the upper surfaces of the pair of side frames 23, 23. The base part 29 is arranged above the inverter unit 13.

The base part 29 is provided so as to connect between upper ends of the pair of support leg parts 27, 27. The base part 29 is formed to extend in the right-to-left direction. The base part 29 is arranged in a state of being separated from the inverter unit 13. The branch unit 15 and the charge circuit 17 are arranged parallel in the right-to-left direction on an upper surface of the base part 29.

The branch unit 15 and the charge circuit 17 are fixed to the upper surface of the base part 29. Thereby, the branch unit 15 and the charge circuit 17 are arranged above the inverter unit 13 in a state of being separated from the motor 11 and the inverter unit 13.

Figure 4:
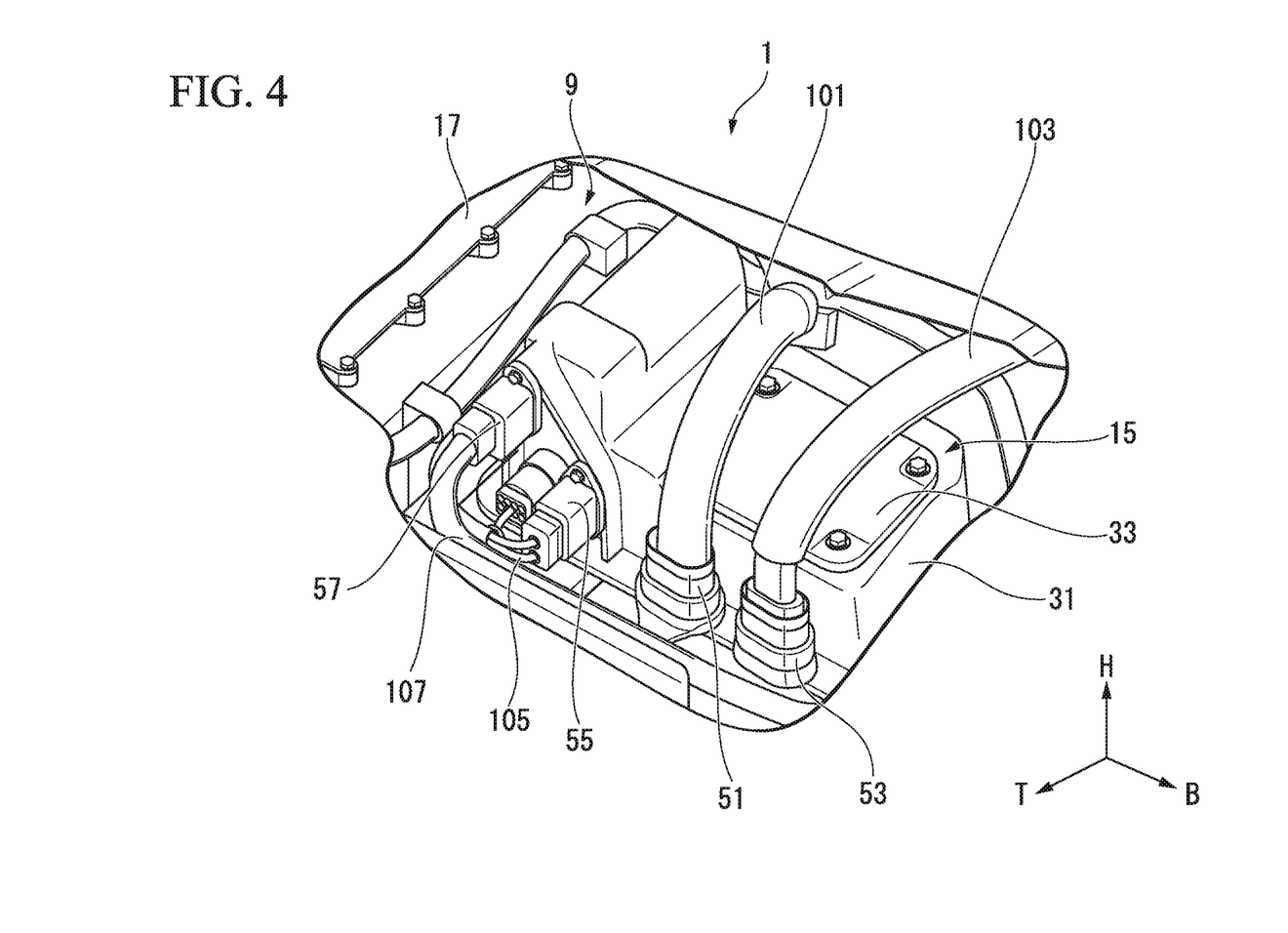
FIG. 4 is a perspective view of the inside of the motor room of the electric vehicle of the embodiment when seen from a vehicle upper direction.

FIG. 4 is a perspective view of the inside of the motor room of the electric vehicle of the embodiment when seen from a vehicle upper direction.

As shown in FIG. 4, the branch unit 15 includes a branch unit main body 31 and a lid part 33. The branch unit main body 31 is formed, for example, in a box shape and has an opening part at an upper portion of the branch unit main body 31. The lid part 33 closes the opening part of the branch unit main body 31. Further, the lid part 33 is attached to the branch unit main body 31, for example, by a special bolt or the like that is attachable and detachable by a special tool such that the opening part of the branch unit main body 31 is capable of being opened and closed.

The branch unit 15 is electrically connected to the battery case 5 (refer to FIG. 1) by the first cable 101. The branch unit 15 is electrically connected to the quick charge circuit 41 by the second cable 103. The first cable 101 and the second cable 103 are arranged so as to straddle the lid part 33 above the branch unit 15.

As shown in FIG. 1 and FIG. 2, the motor 11, the inverter unit 13, the branch unit 15, and the charge circuit 17 are provided in the motor room 9.

Further, the quick charge circuit 41 and the air compressor 43 are provided in the motor room 9. The air compressor 43 is an example of another device.

The motor 11 and the inverter unit 13 are electrically connected, for example, by the three-phase bus bar 113. The connector 51 of the first cable 101 that is connected to the battery 7, the connector 53 of the second cable 103 that is connected to the quick charge circuit 41, the connector 55 of the cable 105 that is connected to the charge circuit 17, and the connector 57 of the cable 107 that extends from the air compressor 43 are fitted to the branch unit 15 (the branch unit main body 31).

A branch part 61, the positive electrode line contactor 63, the negative electrode line contactor 65, a first fuse 67 (fuse), and a second fuse 69 (fuse) are provided in the branch unit 15.

The branch part 61 allows an electric power route from the battery 7 to branch into the charge circuit 17, the quick charge circuit 41, and the air compressor 43. The branch part 61 includes a first positive electrode line 71, a first negative electrode line 73, a second positive electrode line 75, a second negative electrode line 77, a third positive electrode line 81, and a third negative electrode line 83.

The first positive electrode line 71 and the first negative electrode line 73 are electrically connected to the connector 51 of the first cable 101 that is connected to the battery 7 and the connector 53 of the second cable 103 that is connected to the quick charge circuit 41.

The second positive electrode line 75 is formed to branch from a branch point 85 that is provided on the first positive electrode line 71. The second positive electrode line 75 is electrically connected to the connector 57 that is provided on the cable 107 of the air compressor 43.

The second negative electrode line 77 is formed to branch from a branch point 87 that is provided on the first negative electrode line 73. An end part of the second negative electrode line 77 is electrically connected to the connector 57 of the air compressor 43.

The third positive electrode line 81 is formed to branch from a branch point 91 that is provided on the second positive electrode line 75. An end part of the third positive electrode line 81 is electrically connected to the connector 55 of the cable 105 that is connected to the charge circuit 17.

The third negative electrode line 83 is formed to branch from a branch point 93 that is provided on the second negative electrode line 77. An end part of the third negative electrode line 83 is electrically connected to the connector 55 of the cable 105 that is connected to the charge circuit 17.

The positive electrode line contactor 63 is provided between the branch point 85 of the first positive electrode line 71 and the quick charge circuit 41. The negative electrode line contactor 65 is provided between the branch point 87 of the first negative electrode line 73 and the quick charge circuit 41. The positive electrode line contactor 63 and the negative electrode line contactor 65 are examples of a relay. The positive electrode line contactor 63 and the negative electrode line contactor 65 electrically cuts off or connects together the quick charge circuit 41 and the battery 7 by opening and closing a contact point.

The first fuse 67 is provided between the branch point 91 of the second positive electrode line 75 and the connector 55 of the cable 105 that is connected to the charge circuit 17. When a rated current or more flows through the third positive electrode line 81, the first fuse 67 cuts off the current of the third positive electrode line 81.

The second fuse 69 is provided between the branch point 91 of the second positive electrode line 75 and the connector 57 that is provided on the cable 107 of the air compressor 43. When a rated current or more flows through the second positive electrode line 75, the second fuse 69 cuts off the current of the second positive electrode line 75.

The connector 115 of the first cable 101 and the connector 117 of the electric source cable 111 that is connected to the inverter unit 13 are fitted to an outer surface of the battery case 5.

The battery 7, a fourth positive electrode line 121, a fourth negative electrode line 123, a fifth positive electrode line 125, a fifth negative electrode line 127, and a main fuse 141 are provided in the battery case 5.

The battery 7 and the branch unit 15 are electrically connected by the fourth positive electrode line 121, the fourth negative electrode line 123, and the first cable 101. The battery 7 is electrically connected to the charge circuit 17, the quick charge circuit 41, and the air compressor 43 via the branch unit 15.

The fifth positive electrode line 125 is formed to branch from a branch point 131 that is provided on the fourth positive electrode line 121. An end part of the fifth positive electrode line 125 is electrically connected to the connector 117 of the electric source cable 111 that is connected to the inverter unit 13.

The fifth negative electrode line 127 is formed to branch from a branch point 133 that is provided on the fourth negative electrode line 123. An end part of the fifth negative electrode line 127 is electrically connected to the connector 117 of the electric source cable 111 that is connected to the inverter unit 13.

The battery 7 and the inverter unit 13 are electrically connected by the fifth positive electrode line 125, the fifth negative electrode line 127, and the electric source cable 111.

The main fuse 141 is provided between the branch point 131 of the fourth positive electrode line 121 and the battery 7. When a rated current or more flows through the fourth positive electrode line 121, the main fuse 141 cuts off the current of the fourth positive electrode line 121.

Next, a quick charge method of the electric vehicle 1 is described with reference to FIG. 2.

An external electric source for quick charging is connected to the quick charge circuit 41. The external electric source for quick charging is electrically connected to the battery 7 via the quick charge circuit 41, the second cable 103, the branch unit 15, the first cable 101, the fourth positive electrode line 121, and the fourth negative electrode line 123. Thereby, electric power is supplied to the battery 7 from the external electric source for quick charging, and quick charging of the battery 7 is performed.

Next, a usual charge method of the electric vehicle 1 is described. A general external electric source, for example, having a voltage of 100 V or 200 V is connected to the charge circuit 17. The general external electric source is electrically connected to the battery 7 via the charge circuit 17, the cable 105, the branch unit 15, the first cable 101, the fourth positive electrode line 121, and the fourth negative electrode line 123. Thereby, electric power is supplied to the battery 7 from the general external electric source, and the battery 7 is charged.

Next, an operation at the time of traveling of the electric vehicle 1 is described. The battery 7 supplies DC power to the inverter unit 13 via the electric source cable 111. The inverter unit 13 converts DC power that is supplied from the battery 7 into three-phase AC power and supplies the three-phase AC power to the motor 11 via the three-phase bus bar 113. The motor 11 is driven and rotated by the three-phase AC power that is supplied from the inverter unit 13. Thereby, the motor 11 and the shaft 19 are rotated, and the vehicle travels by the front wheels 37, 37 being rotated.

The inverter unit 13 obtains regeneration power from the motor 11 by a braking force, converts the obtained regeneration power into DC power, and supplies the DC power to the battery 7. The battery 7 performs charging by the DC power that is supplied from the inverter unit 13.

The battery 7 supplies DC power to the air compressor 43 via the fourth positive electrode line 121, the fourth negative electrode line 123, the first cable 101, the branch unit 15, and the cable 107. Thereby, the air compressor 43 is driven.

In the electric vehicle 1 of the present embodiment, the inverter unit 13 and the battery 7 are connected by the electric source cable 111, and the battery 7 and the branch unit 15 that is connected to the charge circuit 17 and the air compressor 43 are connected by the first cable 101. That is, since the inverter unit 13 is connected to the battery 7 by the electric source cable 111 (cable), and the branch unit 15 is connected to the battery 7 by the first cable 101 (cable) that is independent of the electric source cable 111 which connects together the inverter unit 13 and the battery 7, it is possible to prevent the diameter of the electric source cable 111 that electrically connects together the battery 7 and the inverter unit 13 from becoming thick compared to the related art in which the branch unit 15 is arranged inside the inverter unit 13. Accordingly, it is possible to easily absorb, according to oscillation absorption, the phase difference between oscillations of the battery 7 and the inverter unit 13 having a different oscillation system from each other by the displacement of the electric source cable 111.

Further, the inverter unit 13 is connected to the battery 7 by the electric source cable 111, the branch unit 15 is connected to the battery 7 by the first cable 101 that is independent of the electric source cable 111 which connects together the inverter unit 13 and the battery 7, and thereby, it is possible to arrange the electric source cable 111 that connects together the inverter unit 13 and the battery 7 and the first cable 101 that connects together the branch unit 15 and the battery 7 separately from each other. Further, the branch unit 15 and the battery 7 are fixed to the vehicle body 39, therefore have an identical oscillation system, and are not greatly oscillated compared to a case (for example, a case in which the branch unit 15 is fixed to the motor 11, and the battery 7 is fixed to the vehicle body 39) in which the branch unit 15 and the battery 7 have a different oscillation system. Accordingly, it is possible to prevent the electric source cable 111 that connects together the inverter unit 13 and the battery 7 and the first cable 101 that connects together the branch unit 15 and the battery 7 from interfering with each other.

Further, the branch unit 15 is fixed to the vehicle body 39 and is arranged in a state of being separated with respect to the inverter unit 13 that is fixed to the motor 11. Thereby, the branch unit 15 is not subject to the oscillation that is generated from the motor 11 when the motor 11 is driven and rotated. Accordingly, the electric vehicle 1 of the present embodiment can prevent the failure of the branch unit 15 that is caused by the oscillation of the motor 11.

Further, in the electric vehicle 1 of the present embodiment, the branch unit 15 includes the first fuse 67 and the second fuse 69 and is arranged above the inverter unit 13. Thereby, the open and close work of the branch unit 15 becomes easy compared to a case in which the branch unit 15 is arranged below the inverter unit 13. Accordingly, in the electric vehicle 1 of the present embodiment, it is possible to easily perform a replacement work of the first fuse 67 and the second fuse 69.

Further, the branch unit 15 is arranged above the inverter unit 13 such that all of the branch unit 15 is overlapped with the inverter unit 13 in a top view, and therefore, a compact arrangement in a top view is realized compared to a case in which the inverter unit 13 and the branch unit 15 are arranged side-by-side. Thereby, it is possible to secure a passage space of a harness and an arrangement space of an auxiliary machine and the like around the motor 11 and the inverter unit 13, and therefore, it is possible to obtain an electric vehicle 1 having an excellent layout property.

Further, in the electric vehicle 1 of the present embodiment, the lid part 33 that is capable of being opened and closed is provided on the upper surface of the branch unit 15. According to this configuration, by opening the lid part 33, it is possible to replace the first fuse 67 and the second fuse 69 that are arranged in the branch unit 15 without unloading the branch unit 15 from the electric vehicle 1. Accordingly, in the electric vehicle 1 of the present embodiment, it is possible to further easily perform a replacement work of the first fuse 67 and the second fuse 69.

Further, in the electric vehicle 1 of the present embodiment, the first cable 101 that electrically connects the battery 7 and the branch unit 15 and the second cable 103 that electrically connects the branch unit 15 and the quick charge circuit 41 are arranged so as to straddle the lid part 33 above the branch unit 15. Thereby, it is possible to effectively use a space that is present above the branch unit 15 as an arrangement space of the first cable 101 and the second cable 103. Accordingly, it is possible to prevent the arrangement space of the first cable 101 and the second cable 103 from being increased. Therefore, in the electric vehicle 1 of the present embodiment, it is possible to save a space with respect to the arrangement of the first cable 101 and the second cable 103.

Further, since the first cable 101 and the second cable 103 are arranged so as to straddle the lid part 33 above the branch unit 15, for example, at the time of a maintenance such as replacing the first fuse 67 and the second fuse 69, it is possible to prevent forgetting to remove the first cable 101 and the second cable 103, and it is possible to open the lid part 33 in a state where the electrical connection to the battery 7 is further reliably cut off.

Further, in the electric vehicle 1 of the present embodiment, the branch unit 15 includes the positive electrode line contactor 63 and the negative electrode line contactor 65 that electrically cut off or connect between the quick charge circuit 41 and the battery 7 by opening and closing a contact point. The branch unit 15 is fixed to the vehicle body 39 in a state of being separated from the motor 11 and the inverter unit 13, and therefore, the positive electrode line contactor 63 and the negative electrode line contactor 65 that are provided on the branch unit 15 are not directly subject to the oscillation that is generated from the motor 11 when the motor 11 is driven and rotated. Accordingly, the electric vehicle 1 of the present embodiment can prevent the degradation of durability of the positive electrode line contactor 63 and the negative electrode line contactor 65 of the branch unit 15 that is caused by the oscillation of the motor 11.

Further, in the electric vehicle 1 of the present embodiment, the relay is the positive electrode line contactor 63 and the negative electrode line contactor 65. Thereby, it is possible to enhance the reliability of the relay with respect to the cutoff and the power distribution.

Further, the quick charge circuit 41, the charge circuit 17, and the air compressor 43 have a different timing at which the battery 7 is charged and discharged via the first cable 101 from one another, and therefore, it is possible to share an electric power cable with respect to each of the circuits (devices) while preventing the diameter of the first cable 101 from becoming thick.

The present invention is not limited to the embodiment described above with reference to the drawings, and it is possible to consider a variety of modification examples in the technical scope of the invention.

In the electric vehicle 1 of the present embodiment, the branch unit 15 is arranged above the inverter unit 13 such that all parts of the branch unit 15 is overlapped with the inverter unit 13 in a top view; however, it is enough to arrange the branch unit 15 above the inverter unit 13 such that at least part of the branch unit 15 is overlapped with the inverter unit 13.

In the electric vehicle 1 of the present embodiment, the positive electrode line contactor 63 and the negative electrode line contactor 65 are included as a relay; however, the relay is not limited to the contactor.

The number of relays (the positive electrode line contactor 63 and the negative electrode line contactor 65) and the number of fuses (the first fuse 67 and the second fuse 69) in the branch unit 15 are not limited to the embodiment.

In the present embodiment, a so-called electric automobile that uses only the motor 11 as a drive source is described as an example of the electric vehicle 1; however, the electric vehicle 1 is not limited to the electric automobile. Accordingly, the electric vehicle 1 may be, for example, a so-called fuel-cell automobile, a so-called hybrid automobile having an internal combustion engine (engine) and a motor, and the like.

The electric vehicle 1 of the present embodiment has a configuration in which the motor 11 is arranged in the motor room 9 on the front side of the vehicle room 3 of the electric vehicle 1; however, the motor 11 may be arranged on the rear side of the vehicle room 3 of the electric vehicle 1. The number of motors 11 is not limited to one and may be two or more.

In the electric vehicle 1 of the present embodiment, the inverter unit 13 and the branch unit 15 are arranged in a state of being separated in the vertical direction (H direction) of the vehicle; however, the separation direction is not specifically limited. For example, the inverter unit 13 and the branch unit 15 may be arranged to be separated in the right-to-left direction (B direction) of the electric vehicle 1.

It is possible to appropriately replace the configuration element in the embodiment described above by a known configuration element without departing from the scope of the invention.

What is claimed is:

1. An electric vehicle comprising:
  a motor that is arranged on a first side of front and rear sides of a vehicle;
  a rechargeable electric source that is fixed to a vehicle body and that is arranged closer to a vehicle room than the motor;
  a battery case that houses the electric source and that comprises a first connector and a second connector;
  an inverter unit fixed to the motor, wherein the inverter unit comprises an inverter that is fixed to the motor and that is configured to control and drive the motor by electric power that is supplied from the electric source;
  a charge circuit that is connected the electric source for charging the electric source;
  a branch unit that is connected to the charge circuit and that is fixed to the vehicle body at the first side of the vehicle, the branch unit being a separate body from the inverter unit;
  a device that is arranged on the first side of the vehicle, wherein the device is driven by electric power that is supplied from the electric source;
  a first cable that connects the first connector to the branch unit; and
  an electric source cable that connects the second connector to the inverter unit, the electric source cable being independent from the first cable,
  wherein the branch unit comprises a branch part that is configured to allow an electric power route from the first connector of the electric source to branch into the charge circuit and the device.

2. The electric vehicle according to claim 1,
  wherein the branch unit comprises a fuse that is connected to the branch part, and
  the branch unit is arranged above the inverter unit such that at least part of the branch unit is overlapped with the inverter unit in a top view.

3. The electric vehicle according to claim 1,
  wherein a lid part that is capable of being opened and closed is provided on an upper surface of the branch unit.

4. The electric vehicle according to claim 3, further comprising:
  a quick charge circuit configured to charge the electric source; and
  a second cable that electrically connects the branch unit and the quick charge circuit,
  wherein
  the first cable electrically connects the electric source and the branch unit, and
  the first cable and the second cable are arranged so as to straddle the lid part above the branch unit.

5. The electric vehicle according to claim 1,
  wherein the branch unit comprises a relay configured to electrically cut off and connect a circuit and the electric source by opening and closing a contact point.

6. The electric vehicle according to claim 4,
  wherein the branch unit comprises a relay configured to electrically cut off and connect the quick charge circuit and the electric source by opening and closing a contact point.

7. The electric vehicle according to claim 5, wherein the relay is a contactor.

* * * * *